US012148431B2

(12) United States Patent
Chae et al.

(10) Patent No.: US 12,148,431 B2
(45) Date of Patent: Nov. 19, 2024

(54) METHOD AND DEVICE FOR GENERATING SPEECH VIDEO USING AUDIO SIGNAL

(71) Applicant: DEEPBRAIN AI INC., Seoul (KR)

(72) Inventors: Gyeongsu Chae, Seoul (KR); Guembuel Hwang, Seoul (KR); Sungwoo Park, Seoul (KR); Seyoung Jang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 449 days.

(21) Appl. No.: 17/620,867

(22) PCT Filed: Jun. 19, 2020

(86) PCT No.: PCT/KR2020/007975
§ 371 (c)(1),
(2) Date: Apr. 20, 2022

(87) PCT Pub. No.: WO2020/256472
PCT Pub. Date: Dec. 24, 2020

(65) Prior Publication Data
US 2022/0399025 A1      Dec. 15, 2022

(30) Foreign Application Priority Data

Jun. 21, 2019   (KR) .................. 10-2019-0074150
Jun. 11, 2020   (KR) .................. 10-2020-0070748

(51) Int. Cl.
*G10L 17/14*      (2013.01)
*G06N 3/08*       (2023.01)
(Continued)

(52) U.S. Cl.
CPC ............... *G10L 17/14* (2013.01); *G06N 3/08* (2013.01); *G10L 17/02* (2013.01); *G10L 21/10* (2013.01);
(Continued)

(58) Field of Classification Search
CPC ......... G10L 17/14; G10L 17/02; G10L 21/10; G10L 25/30; G10L 2021/105; G06N 3/08;
(Continued)

(56) References Cited

U.S. PATENT DOCUMENTS 11,972,516 B2 *   4/2024   Chae .................... G06N 3/08
2022/0351439 A1 * 11/2022  Chae .................... G10L 13/027
(Continued)

FOREIGN PATENT DOCUMENTS

KR     10-2006-0090687 A      8/2006
KR     10-2014-0037410 A      3/2014
(Continued)

OTHER PUBLICATIONS

Jamaludin, A., Chung, J. S., & Zisserman, A. (2019). You said that?: Synthesising talking faces from audio. International Journal of Computer Vision, 127, 1767-1779.*
(Continued)

*Primary Examiner* — Edwin S Leland, III
(74) *Attorney, Agent, or Firm* — The PL Law Group, PLLC

(57) ABSTRACT

A device according to an embodiment has one or more processors and a memory storing one or more programs executable by the one or more processors. The device includes a first encoder configured to receive a person background image corresponding to a video part of a speech video of a person and extract an image feature vector from the person background image, a second encoder configured to receive a speech audio signal corresponding to an audio part of the speech video and extract a voice feature vector from the speech audio signal, a combiner configured to generate a combined vector by combining the image feature vector output from the first encoder and the voice feature
(Continued)

vector output from the second encoder, and a decoder configured to reconstruct the speech video of the person using the combined vector as an input.

7 Claims, 9 Drawing Sheets

(51) Int. Cl.
*G10L 17/02* (2013.01)
*G10L 21/10* (2013.01)
*H04N 5/265* (2006.01)
*H04N 21/2368* (2011.01)
*H04N 21/439* (2011.01)
*G10L 25/30* (2013.01)

(52) U.S. Cl.
CPC ......... *H04N 5/265* (2013.01); *H04N 21/2368* (2013.01); *H04N 21/439* (2013.01); *G10L 2021/105* (2013.01); *G10L 25/30* (2013.01)

(58) Field of Classification Search
CPC ... H04N 5/265; H04N 21/2368; H04N 21/439
USPC .......................................................... 704/231
See application file for complete search history.

(56) References Cited

U.S. PATENT DOCUMENTS

2022/0358703 A1* 11/2022 Chae .................... G06T 13/205
2022/0399025 A1* 12/2022 Chae ........................ G10L 17/14
2024/0046951 A1* 2/2024 Kim ........................ G06T 13/80
2024/0055015 A1* 2/2024 Chae ........................ G10L 25/57

FOREIGN PATENT DOCUMENTS

KR   10-2019-0046371 A     5/2019
WO   WO 2018/213841 A1    11/2018

OTHER PUBLICATIONS

Lele Chen et al., "Hierarchical Cross-Modal Talking Face Generation with Dynamic Pixel-Wise Loss", arXiv:1905.03820v1, 2019.
Lele Chen et al., "Lip Movements Generation at a Glance", ECCV 2018.
Rithesh Kumar et al., "ObamaNet: Photo-realistic lip-sync from text", arXiv:1801.01442v1, NIPS 2017.
International Search Report for PCT/KR2020/007975 mailed on Oct. 7, 2020.
Konstantinos Vougioukas et al., "Realistic Speech-Driven Facial Animation with GANs", Jinternational Journal of Computer Vision, vol. 128, Nr:5, pp. 1398-1413, 2019.
Triantafyllos Afouras et al., "Deep Audio-Visual Speech Recognition", IEEE Transactions on Pattern Analysis and Machine Intelligence, 2018, See pp. 3-4; and figure 2.

* cited by examiner

METHOD AND DEVICE FOR GENERATING SPEECH VIDEO USING AUDIO SIGNAL

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/007975, filed Jun. 19, 2020, which claims priority to the benefit of Korean Patent Application Nos. 10-2019-0074150 filed on Jun. 21, 2019 and 10-2020-0070748 filed on Jun. 11, 2020 in the Korean Intellectual Property Office, the entire contents of which are incorporated herein by reference.

BACKGROUND

1. Technical Field

Embodiments of the present disclosure relate to a technology for generating a speech video on the basis of machine learning.

2. Background Art

Recently, various types of content have been generated through the use of artificial intelligence technology, in line with technological developments in the artificial intelligence field. As an example thereof, in the case that a spoken message is intended to be delivered, a speech video in which a famous person, such as a President, delivers the message as a speech may be generated from the spoken message in order to attract people's attention. The speech video of the famous person may be generated by changing the shape of the person's mouth to match the words of a specific message, as if the famous person were speaking.

In this regard, in the related art, a method of generating landmarks or key points related to a voice from an existing speech image, learning the landmarks or key points, and then synthesizing an image matching an input voice using a learned model has been used. However, in this related-art technology, for such learning, a process of extracting key points and transforming and inverse transforming the extracted key points to a standard space (i.e., a position facing the front from the center of the screen) is essentially required, and a step of synthesizing the key points and a step of synthesizing images are required. Accordingly, the process is complicated, which is problematic.

In addition, in the case that no key points are used, a method of extracting a face portion, arranging the size and position, and then synthesizing an image matching an input voice is used. Since a natural movement of a person is not reflected, a resultant image may be unnatural, which is problematic.

SUMMARY

Embodiments of the present disclosure provide a method and device for generating a speech video, wherein the method and device may reflect movements or gestures occurring in the case of a voice speech.

Embodiments of the present disclosure also provide a method and device for generating a speech video, wherein the method and device may improve the efficiency of learning by uniformizing the phase of a combined vector input to a decoder.

According to an embodiment, provided is a device for generating a speech video having one or more processors and a memory storing one or more programs executable by the one or more processors, the device comprises: a first encoder configured to receive a person background image corresponding to a video part of a speech video of a person and extract an image feature vector from the person background image; a second encoder configured to receive a speech audio signal corresponding to an audio part of the speech video and extract a voice feature vector from the speech audio signal; a combiner configured to generate a combined vector by combining the image feature vector output from the first encoder and the voice feature vector output from the second encoder; and a decoder configured to reconstruct the speech video of the person using the combined vector as an input.

The image feature vector may be a 3-dimensional vector in a form of height×width×channel, and the voice feature vector may be a 1-dimensional vector in a form of the channel. The combiner may be further configured to transform the voice feature vector into a tensor having the same form as the image feature vector by copying the voice feature vector by the height of the image feature vector in a height direction and copying the voice feature vector by the width of the image feature vector in a width direction, and generate the combined vector by concatenating the image feature vector and the voice feature vector having the same form as the image feature vector.

The person background image input to the first encoder may include a face and an upper body of the person, with a portion related to speech of the person being covered with a mask.

The image feature vector may be a 3D tensor in a form of height×width×channel, and the voice feature vector may be a 1D vector in a form of channel. The second encoder may be further configured to output the voice feature vector having the same size as the height×width of the image feature vector. The combiner may be further configured to reshape the voice feature vector into a 2D tensor having a form matching the height×width of the image feature vector, and generate the combined vector by multiplying each channel of the image feature vector by the reshaped voice feature vector.

The person background image input to the first encoder may include a face and an upper body of the person, with a portion related to speech of the person being covered with a mask.

The image feature vector may be a 3D tensor in a form of height×width×channel, and the voice feature vector may be a 1D vector in a form of channel. The second encoder may be further configured to output the voice feature vector having the same size as the channel of the image feature vector. The combiner may be further configured to reshape the voice feature vector into a 3D tensor having a form matching the channel of the image feature vector, and generates the combined vector by multiplying each height and width of the image feature vector by the reshaped voice feature vector.

The person background image input to the first encoder may include a face and an upper body of the person, with a portion related to the speech of the person being covered with a mask.

According to an embodiment, provided is a method for generating a speech video executed by a computing device including one or more processors and a memory storing one or more programs executable by the one or more processors, the method comprises: receiving a person background image corresponding to a video part of a speech video of a person; extracting an image feature vector from the person background image; receiving a speech audio signal corresponding to an audio part of the speech video; extracting a voice feature vector from the speech audio signal; generating a combined vector by combining the image feature vector output from a first encoder and the voice feature vector output from a second encoder; and reconstructing the speech video of the person using the combined vector as an input.

According to embodiments of the present disclosure, learning is performed using the person background image including the face and the upper body in a situation in which the portions related to a speech are masked. Thus, it is possible to generate a speech video by reflecting gestures or characteristics unique to the person, such as movements of the face, neck, shoulders, and the like of the person, which occur when the person is speaking. Consequently, it is possible to generate a video containing a more natural speech.

In addition, the combined vector is generated by multiplying an image feature vector and a voice feature vector. Thus, it is possible to uniformize the phases of feature vectors input to the decoder, thereby improving the efficiency of learning. In addition, learning of the spatial relationship between a video part and an audio part may be promoted.

DETAILED DESCRIPTION

Hereinafter, specific embodiments of the present disclosure will be described with reference to the accompanying drawings. The following detailed description is provided to assist in gaining a comprehensive understanding of at least one of a method, a device, and a system to be described herein. However, the detailed description is merely exemplary, and the present disclosure is not limited thereto.

In the description of embodiments of the present disclosure, a detailed description of known technologies related to the present disclosure will be omitted in the case in which the subject matter of the present disclosure may be rendered unclear thereby. Terms to be used hereinafter will be defined in consideration of functions thereof in embodiments of the present disclosure, but may vary depending on the intentions of users or operators, as well as in practice. Therefore, the terms shall be defined on the basis of the descriptions throughout the specification. The terms used in the detailed description shall be interpreted as being illustrative, while not being limitative, of embodiments. Unless clearly used otherwise, a singular form includes a plural meaning. It shall be understood that expressions such as "comprise," "include," and "have," as used herein, are for indicating certain features, numbers, steps, operations, elements, a portion or combinations thereof and are not to be interpreted as excluding the presence or possibility of one or more features, numbers, steps, operations, elements, a portion or combinations thereof other than the above.

In the following description, terms, such as "sending," "communication," "transmission," and "reception" of a signal or information include not only direct transfer of a signal or information from a first element to a second element, but also the transfer of a signal or information from the first element to the second element through a third intervening element. In particular, the "transmission" or "sending" of a signal or information to the first element refers to a final designation of the signal or information but does not refer to a direct destination. This is the same regarding the "reception" of a signal or information. In addition, herein, a "relation" of two or more pieces of data or information indicates that acquisition of first data (or information) may acquire second data (or information) on the basis of the first data (or information).

In addition, terms, such as first and second, may be used in describing a variety of elements, but the elements are not limited by such terms. Such terms may be used to distinguish one element from other elements. For example, a first element may be referred to as a second element and, in a similar manner, a second element may be referred to as a first element without departing from the scope of the present disclosure.

Figure 1:
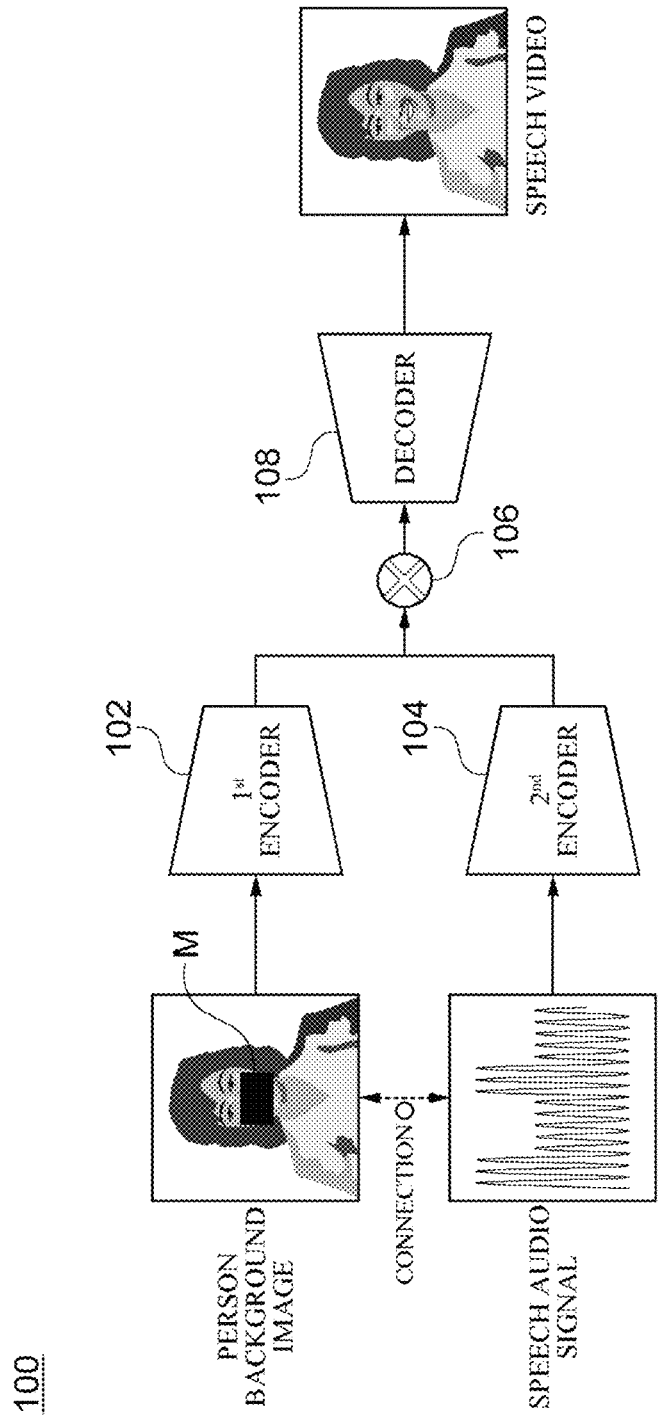
FIG. 1 is a block diagram illustrating a configuration of a device for generating a speech video according to an embodiment of the present disclosure.

FIG. 1 is a block diagram illustrating a configuration of a device 100 for generating a speech video according to an embodiment of the present disclosure. Referring to FIG. 1, the device 100 for generating a speech video may include a first encoder 102, a second encoder 104, a combiner 106, and a decoder 108.

The configuration of the device 100 for generating a speech video illustrated in FIG. 1 shows functionally distinguished functional elements. The functional elements may be functionally connected to each other in order to perform functions according to the present disclosure and, one or more of the functional elements may be physically integrated.

In an example embodiment, the device 100 for generating a speech video may be implemented by a machine learning technology based on a convolutional neural network (CNN), but the machine learning technology is not limited thereto. Rather, a variety of other machine learning technologies may be used. Hereinafter, a learning process for generating a speech video will mainly be described.

The first encoder 102 may be a machine learning model that is trained to extract an image feature vector using a person background image as an input. Hereinafter, the term "vector" may be used with a meaning encompassing a "tensor."

Here, the person background image input to the first encoder 102 is an image in which a person utters (or speaks). The person background image may be an image including a face and an upper body of a person. That is, the person background image may include not only the face but also the upper body of the person so that movements of the face, neck, shoulders, and the like occurring when the corresponding person is speaking may be seen.

In the person background image input to the first encoder 102, portions related to the speech may be masked. That is, in the person background image, the portions related to the speech (e.g., the mouth and portions around the mouth) may be covered with a mask M. In addition, during a masking process, the portions related to movements of the face, neck, shoulders, and the like caused by the speech of the person in the person background image may not be masked. Then, the first encoder 102 extracts an image feature vector from portions of the person background image, except for the portions related to the speech.

The first encoder 102 may include at least one convolutional layer and at least one pooling layer. The convolutional layer may extract feature values of pixels corresponding to a filter having a predetermined size (e.g., 3×3 pixel size) while moving the filter at predetermined intervals in the input person background image. The pooling layer may perform down-sampling by using an output of the convolutional layer as an input.

The second encoder 104 is a machine learning model that is trained to extract a voice feature vector using a speech audio signal as an input. Here, the speech audio signal corresponds to an audio part of the person background image (i.e., an image in which the person is speaking) input to the first encoder 102. In other words, in a video in which a person speaks (hereinafter, referred to as a "speech video"), a video part thereof may be input to the first encoder 102, and an audio part thereof may be input to the second encoder 104. The second encoder 104 may include at least one convolutional layer and at least one pooling layer, but the neural network structure of the second encoder 104 is not limited thereto.

The time of the person background image input to the first encoder 102 and the time of the speech audio signal input to the second encoder 104 may be synchronized. That is, in the speech video, in the same time section, the video part may be input to the first encoder 102, and the audio part may be input to the second encoder 104. Here, the person background image and the speech audio signal may be input to the first encoder 102 and the second encoder 104, respectively, at predetermined unit times (e.g., a single frame or a plurality of continuous frames).

The combiner 106 may generate a combined vector by combining an image feature vector output from the first encoder 102 and a voice feature vector output from the second encoder 104. In an example embodiment, the combiner 106 may generate a combined vector by concatenating the image feature vector and the voice feature vector, but is not limited thereto.

The decoder 108 may reconstruct the speech video of a person using the combined vector output from the combiner 106 as an input. Specifically, the decoder 108 may be a machine learning model that is trained to reconstruct a portion (i.e., a portion related to a speech) covered with the mask M, of the image feature vector output from the first encoder 102 (i.e., the feature of a video part of the speech video, in which a portion related to the speech is covered with the mask), on the basis of the voice feature vector output from the second encoder 104 (i.e., the feature of the audio part of the speech video). That is, the decoder 108 may be a model that is trained to reconstruct a masked portion in the person background image using the audio signal when a portion related to the speech in the person background image is masked.

In an example embodiment, the decoder 108 may generate the speech video by performing deconvolution on the combined vector in which the image feature vector output from the first encoder 102 and the voice feature vector output from the second encoder 104 are combined, followed by up-sampling.

The decoder 108 may compare the generated speech video with the original speech video (i.e., an answer value) and thus adjust learning parameters (e.g., the loss function or the Softmax function) so that the generated speech video (i.e., a video in which the portion related to the speech are reconstructed through the audio part) is similar to the original speech video.

Figure 2:
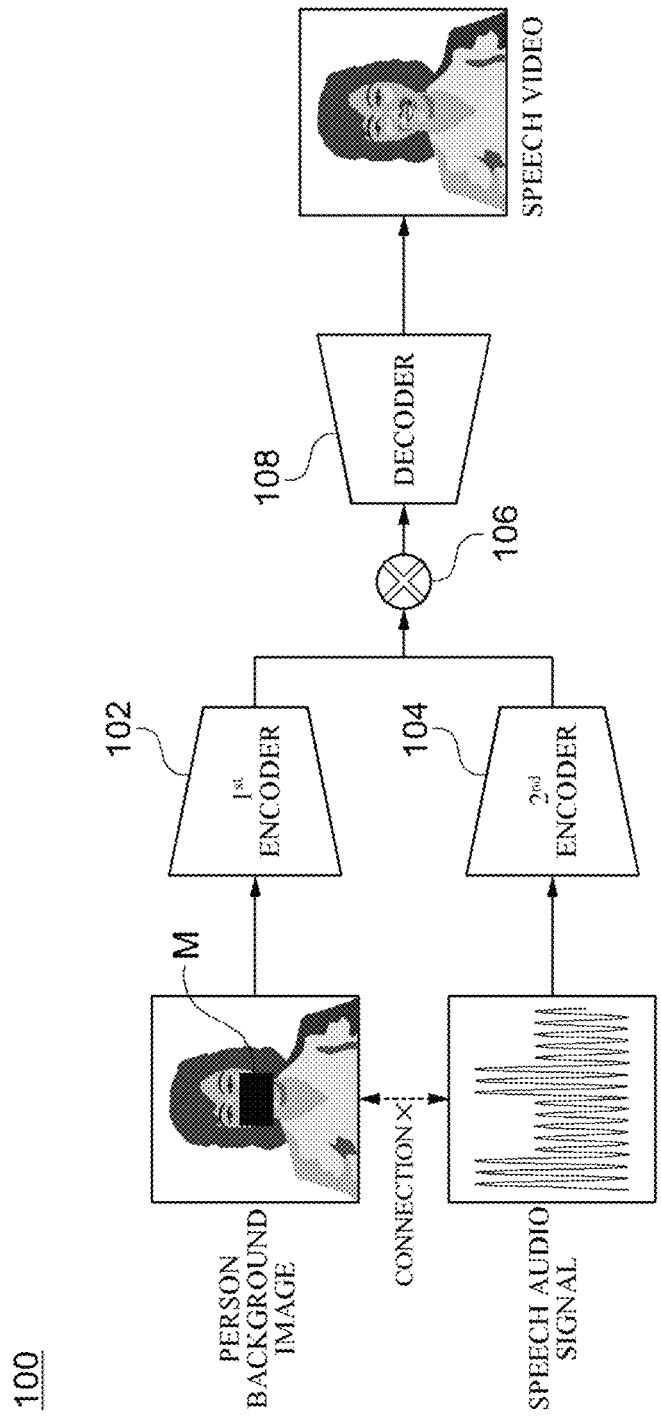
FIG. 2 is a diagram illustrating a state in which a speech video is inferred through the device for generating a speech video according to the embodiment of the present disclosure.

FIG. 2 is a diagram illustrating a state in which a speech video is inferred through the device for generating a speech video according to the embodiment of the present disclosure.

Referring to FIG. 2, the first encoder 102 receives a person background image as an input. Here, the person background image may be an image used during a training process. The person background image may be an image including the face and the upper body of a person. In addition, a portion of the person background image related to a speech may be covered with a mask M. The first encoder 102 may extract an image feature vector from the person background image.

The second encoder 104 receives a speech audio signal as an input. Here, the speech audio signal may not be related to the person background image input to the first encoder 102. For example, the speech audio signal may be a speech audio signal of another person different from the person in the person background image. However, the speech audio signal is not limited thereto, and may be a speech audio signal generated from a speech made by the person in the person background image. Here, the speech of the corresponding person may be generated in a background or a situation not related to the person background image. The second encoder 104 may generate the voice feature vector from the speech audio signal.

The combiner 106 may generate a combined vector by combining the image feature vector output from the first encoder 102 and the voice feature vector output from the second encoder 104.

The decoder 108 may reconstruct and output the speech video using the combined vector as an input. That is, the decoder 108 may generate the speech video by reconstructing a portion of the person background image related to the speech on the basis of the voice feature vector output from the second encoder 104. In this case, although the speech audio signal input to the second encoder 104 is a speech not related to the person background image (e.g., a speech not made by the person in the person background image), the speech video is generated as if the person in the person background image is speaking.

According to embodiments of the present disclosure, the learning is performed using the person background image including the face and the upper body as an input in a situation in which the portions related to the speech are masked. Thus, it is possible to generate the speech video by reflecting gestures or characteristics unique to the person, such as movements of the face, neck, shoulders, and the like of the person, which occur when the person is speaking. Consequently, it is possible to generate a more natural speech video.

In addition, it is possible to generate the speech video using a single neural network model without a separate key point estimation process by inputting the video part of the speech video to the first encoder 102, inputting the audio part of the speech video to the second encoder 104, and reconstructing the masked portions related to the speech from the audio.

In addition, since the speech video including not only the face but also the upper body of the corresponding person is generated, it can be naturally pasted without additional transformation or synthesis of other body parts of the person.

Figure 3:
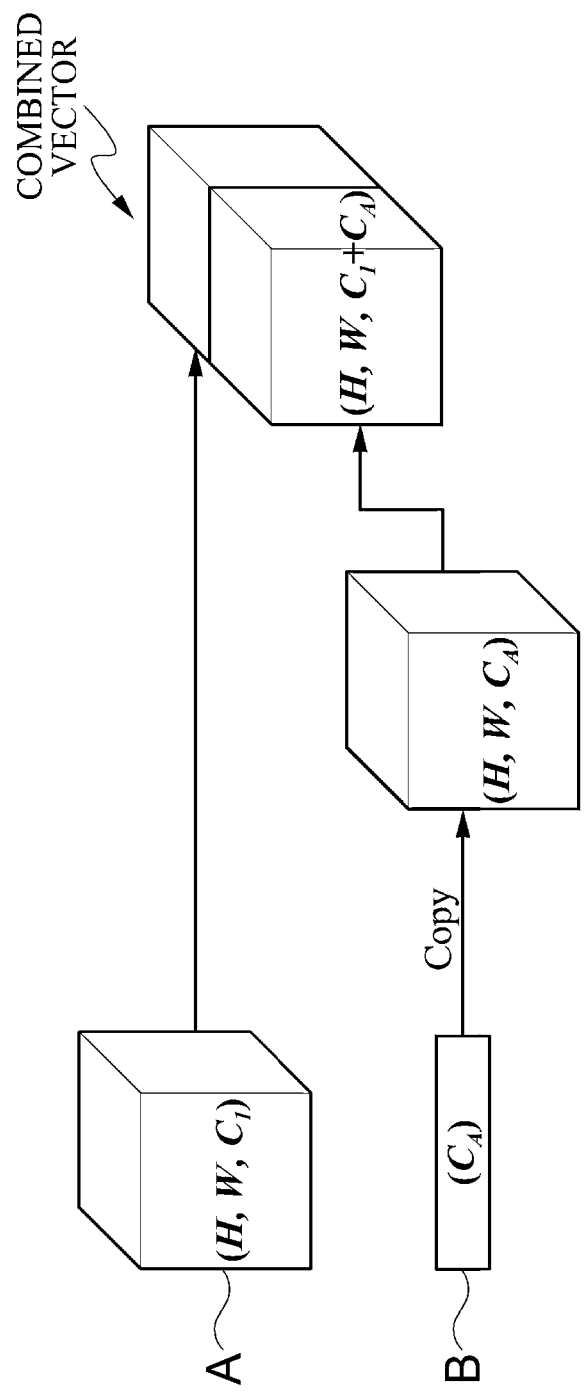
FIG. 3 is a diagram illustrating a process of generating a combined vector in the device for generating a speech video according to the embodiment of the present disclosure.

FIG. 3 is a diagram illustrating a process of generating a combined vector in the device for generating a speech video according to the embodiment of the present disclosure.

Referring to FIG. 3, an image feature vector A output from the first encoder 102 has a data structure in a form of height×width×channel (i.e., a 3-dimensional (3D) tensor). When the person background image is input, the first encoder 102 performs down-sampling on the person background image along axes in height and width directions, and outputs the image feature vector A (H, W, $C_I$) in a compressed form.

A voice feature vector B output from the second encoder 104 has a data structure (i.e., a 1-dimensional (1D) vector) in a form of channel. When a speech audio signal is input, the second encoder 104 performs down-sampling on the speech audio signal along the time axis, and outputs the voice feature vector B ($C_A$) in a compressed formed.

Here, the combiner 106 may transform the voice feature vector B ($C_A$) into a vector having the same form as the image feature vector A (H, W, $C_A$) by copying the voice feature vector B by the height of the image feature vector A in the height direction and copying the voice feature vector B by the width of the image feature vector A in the width direction: ($C_A$)→(H, W, $C_A$). That is, the combiner 106 may form the voice feature vector B into a tensor having the same height×width×channel as the image feature vector A.

Next, the combiner 106 may generate a combined vector (H, W, $C_I$+$C_A$) by concatenating the voice feature vector B (H, W, $C_A$) and the image feature vector A (H, W, $C_I$).

Although it has been described here that the combiner 106 generates the combined vector by concatenating the voice feature vector B (H, W, $C_A$) and the image feature vector A (H, W, $C_I$), the present disclosure is not limited thereto. The combined vector may be generated by multiplying the image feature vector A and the voice feature vector B. In this case, the phases of the feature vectors input to the decoder 108 may be uniformized, thereby improving the efficiency of learning. In addition, learning of the spatial relationship between a video part and an audio part may be promoted.

Figure 4:
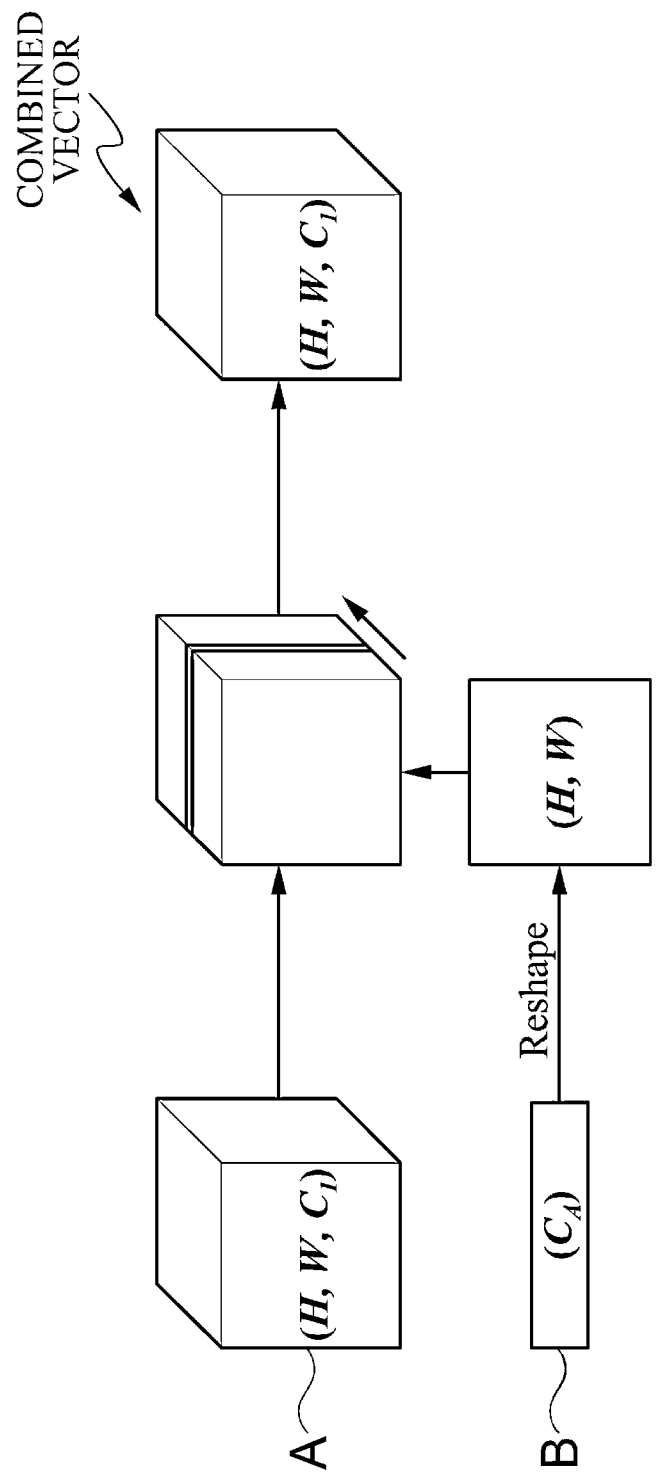
FIG. 4 is a diagram illustrating an embodiment in which the combiner according to the present disclosure generates a combined vector by multiplying an image feature vector and a voice feature vector.

FIG. 4 is a diagram illustrating an embodiment in which the combiner 106 according to the present disclosure generates a combined vector by multiplying an image feature vector and a voice feature vector.

Referring to FIG. 4, the second encoder 104 may output a voice feature vector B ($C_A$) having the same size as the height×width of an image feature vector A. The second encoder 104 may adjust parameters (e.g., a filter size, the number of layers, and the number of parameters) in the neural network so as to output the voice feature vector B having the same size as the height×width of the image feature vector A.

The combiner 106 may reshape the voice feature vector B ($C_A$) into a tensor having a form corresponding to the height×width of the image feature vector A. That is, the combiner 106 may reshape the voice feature vector B ($C_A$) having the 1D form into a 2D tensor (H, W) having a height×width form, thereby transforming the voice feature vector B ($C_A$) into a spatial form.

Here, the voice feature vector B ($C_A$) is generated in the same size as the height×width of the image feature vector A. Thus, the combiner 106 may reshape the voice feature vector B into a 2D tensor having the same form as the height×width of the image feature vector A.

Next, the combiner 106 may generate a combined vector (H, W, $C_I$) by multiplying the reshaped voice feature vector B (i.e., a vector (H, W)) for each channel ($C_I$) of the image feature vector A. In this case, the voice feature vector may be induced to learn a spatial symbol.

Figure 5:
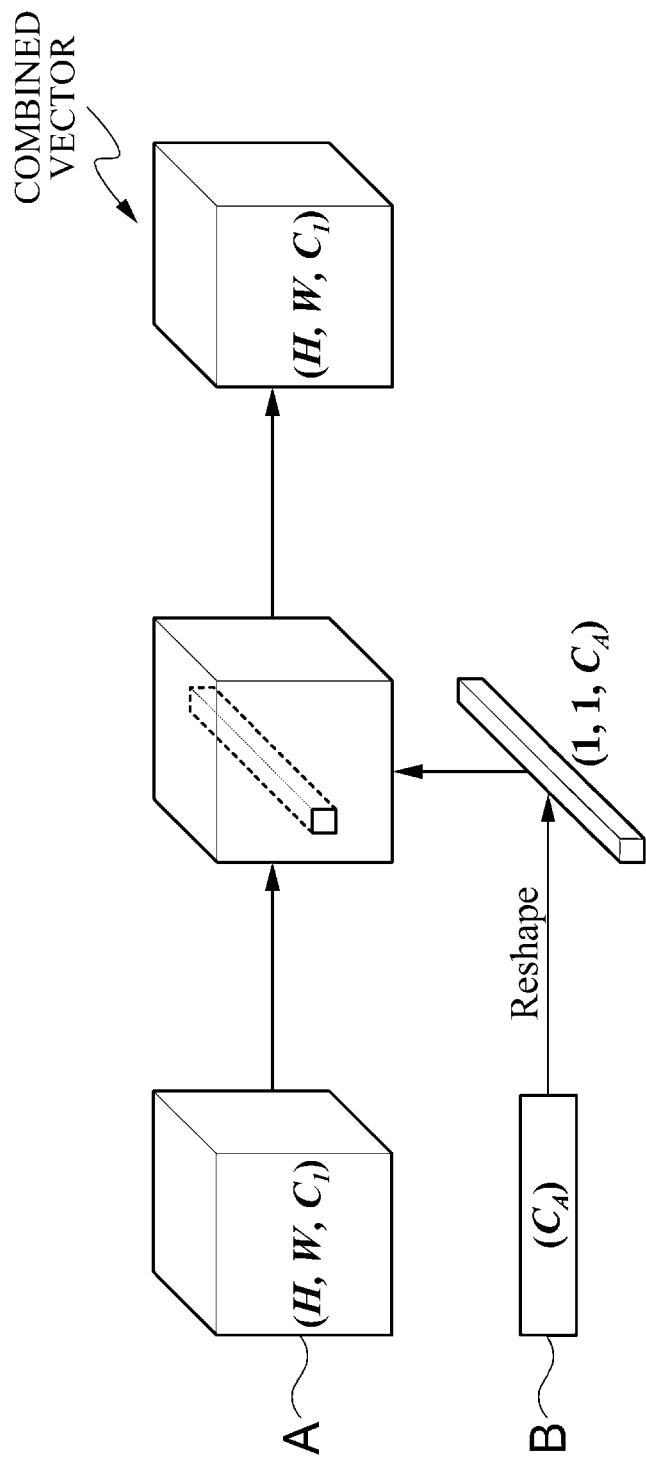
FIG. 5 is a diagram illustrating another embodiment in which the combiner according to the present disclosure generates a combined vector by multiplying an image feature vector and a voice feature vector.

FIG. 5 is a diagram illustrating another embodiment in which the combiner 106 according to the present disclosure generates a combined vector by multiplying an image feature vector and a voice feature vector.

Referring to FIG. 5, the second encoder 104 may output a voice feature vector B ($C_A$) having the same size as the channel of an image feature vector A. The second encoder 104 may adjust parameters (e.g., a filter size, the number of layers, and the number of parameters) in the neural network so as to output the voice feature vector B having the same size as the channel of the image feature vector A.

The combiner 106 may reshape the voice feature vector B ($C_A$) into a tensor having a form corresponding to the channel of the image feature vector A. That is, the combiner 106 may reshape the voice feature vector B ($C_A$) having the 1D form into a 3D tensor (1, 1, $C_A$) having a 1×1×channel form, thereby transforming the voice feature vector B ($C_A$) into a spatial form.

Next, the combiner 106 may generate a combined vector (H, W, $C_I$) by multiplying the reshaped voice feature vector B (i.e., a tensor (1, 1, $C_A$)) for each height and width of the image feature vector A. In this case, the voice feature vector learns an average speech feature for each channel of the image feature vector.

Figure 6:
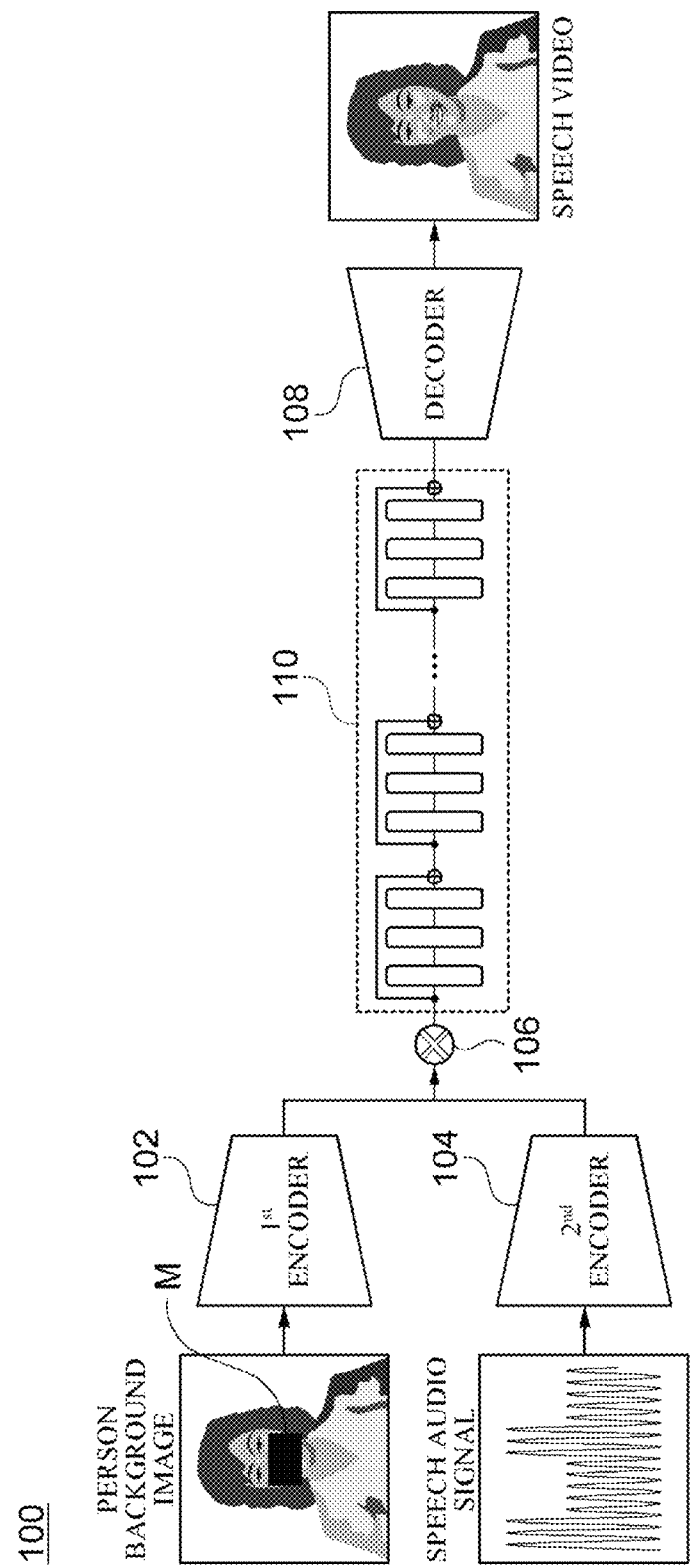
FIG. 6 is a diagram illustrating a configuration of a device for generating a speech video according to another embodiment of the present disclosure.

FIG. 6 is a diagram illustrating a configuration of a device for generating a speech video according to another embodiment of the present disclosure. Here, features different from those of the foregoing embodiment illustrated in FIG. 1 will be mainly described.

Referring to FIG. 6, the device 100 for generating a speech video may further include residual blocks 110. One or more residual blocks 110 may be provided between the combiner 106 and the decoder 108. In an example embodiment, a plurality of residual blocks 110 may be provided between the combiner 106 and the decoder 108 and may be being sequentially connected (in series) between the combiner 106 and the decoder 108.

The residual blocks 110 may include one or more convolutional layers. the residual blocks 110 may have a structure performing convolution to an input value (i.e., a combined vector output from the combiner 106) and adding the input value to a result value obtained by performing the convolution. The residual blocks 110 may be trained to minimize a difference between the input value and the output value of the residual blocks 110. In this manner, the image feature vector and the voice feature vector extracted from the video and the audio of the speech video, respectively, may be systematically combined to be used as an input to the decoder 108.

Figure 7:
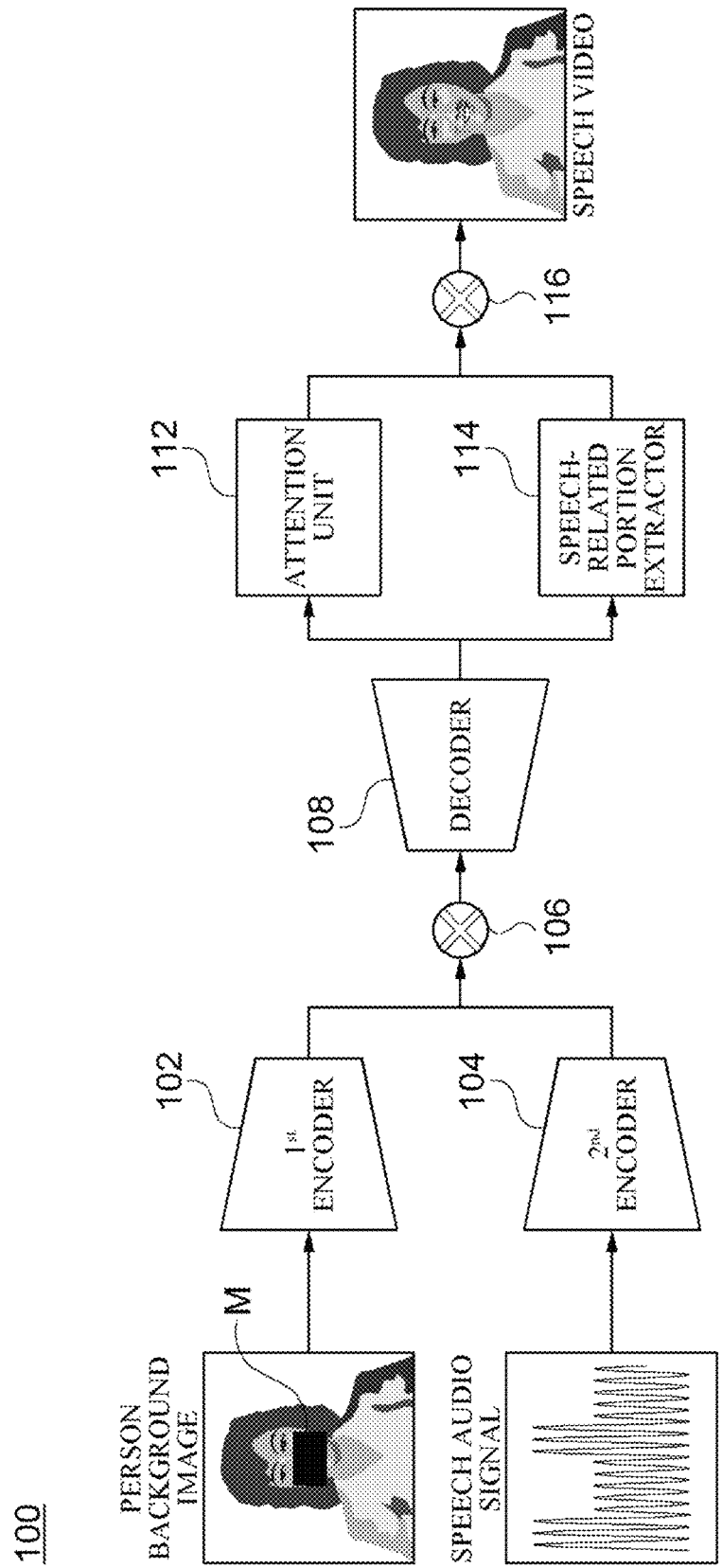
FIG. 7 is a diagram illustrating a configuration of a device for generating a speech video according to another embodiment of the present disclosure.

FIG. 7 is a diagram illustrating a configuration of a device for generating a speech video according to another embodiment of the present disclosure. Here, features different from those of the foregoing embodiment illustrated in FIG. 1 will be mainly described.

Referring to FIG. 7, the device 100 for generating a speech video may further include an attention unit 112, a speech-related portion extractor 114, and a reconstruction outputter 116.

Here, the attention unit 112 and the speech-related portion extractor 114 may be connected to output of the decoder 108, respectively. That is, each of the attention unit 112 and the speech-related portion extractor 114 may receive the speech video (hereinafter, also referred to as a first-reconstructed speech video) output from the decoder 108 as an input.

The attention portion 112 may output an attention map by determining pixel-specific attention weights of the first-reconstructed speech video. Each of the attention weights may be a value in the range of 0 to 1.

Specifically, in second reconstruction of the speech video according to the pixels of the first-reconstructed speech video by the reconstruction outputter 116, the attention unit 112 may set the attention weights for determining whether to use a person background image (i.e., an image in which speech-related portions are covered with a mask) used as an input to the first encoder 102 or a speech-related image output from the speech-related portion extractor 114.

The speech-related portion extractor 114 may output the speech-related image by extracting the portions related to the speech (i.e., the speech-related portions) from the first-reconstructed speech video. In an example embodiment, the speech-related portion extractor 114 may generate a speech-related image by extracting pixel values of the speech-related portions of the first-reconstructed speech video and filling the remaining portions with random values (e.g., unused values).

The reconstruction outputter 116 may output a final speech video by combining the person background image used as an input to the first encoder 102, the attention map output from the attention unit 112, and the speech-related image output from the speech-related portion extractor 114.

The reconstruction outputter 116 may reconstruct the final speech video using the background image for the portions not related to the speech and reconstruct the final speech video using the speech-related image for the speech-related portions, on the basis of the attention map (including pixel-specific attention weight values).

In an example embodiment, the reconstruction outputter 116 may reconstruct the final speech video P by the following Equation 1.

$$P = A \cdot I + (I - A) \cdot C \quad (1)$$

where A indicates the attention weight of each of the pixels, I indicates each of the pixel values of the person background image, and C indicates each of the pixel values of the speech-related image.

According to Equation 1, as A is closer to 0, the final speech video is more influenced by the speech-related image. On the other hand, as A is closer to 1, the final speech video is more influenced by the person background image. Thus, the attention unit 112 may determine the pixel-specific attention weights so that each of the attention weights of the portions not related to the speech is close to 1 and each of the attention weights of the speech-related portions is close to 0.

Figure 8:
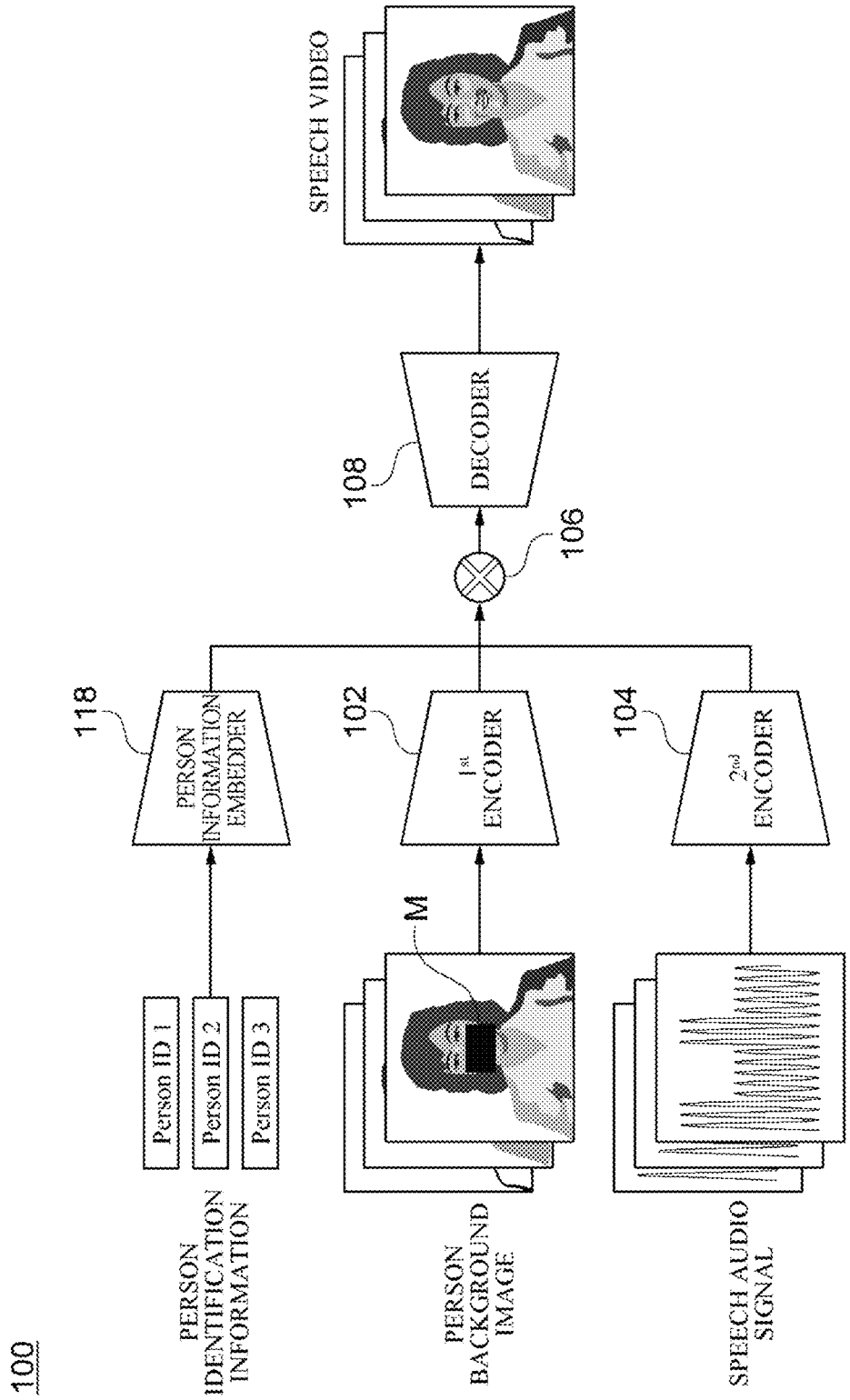
FIG. 8 is a diagram illustrating a neural network structure for generating a speech video for each of a plurality of persons according to embodiments of the present disclosure.

In addition, in the embodiment of the present disclosure, as illustrated in FIG. 8, speech videos of a plurality of persons may be generated. Referring to FIG. 8, person background images of a plurality of persons (e.g., A, B, and C) may be input to the first encoder 102. In addition, speech audio signals of the plurality of persons (e.g., A, B, and C) may be input to the second encoder 104.

In addition, a person information embedder 118 may receive person identification information regarding the plurality of persons. The person information embedder 118 may generate an embedding vector by embedding the person identification information regarding each of the persons.

The combiner 106 may generate a combined vector by combining the embedding vector, the image feature vector, and voice feature vector regarding each of the persons. The decoder 108 may reconstruct the speech video regarding each of the persons on the basis of the combined vector regarding each of the persons.

Since the speech videos of the plurality of persons are learned using a single neural network model as described above, common portions of images and voices of the plurality of persons can be learned. Accordingly, the learning can be performed more rapidly and efficiently.

Figure 9:
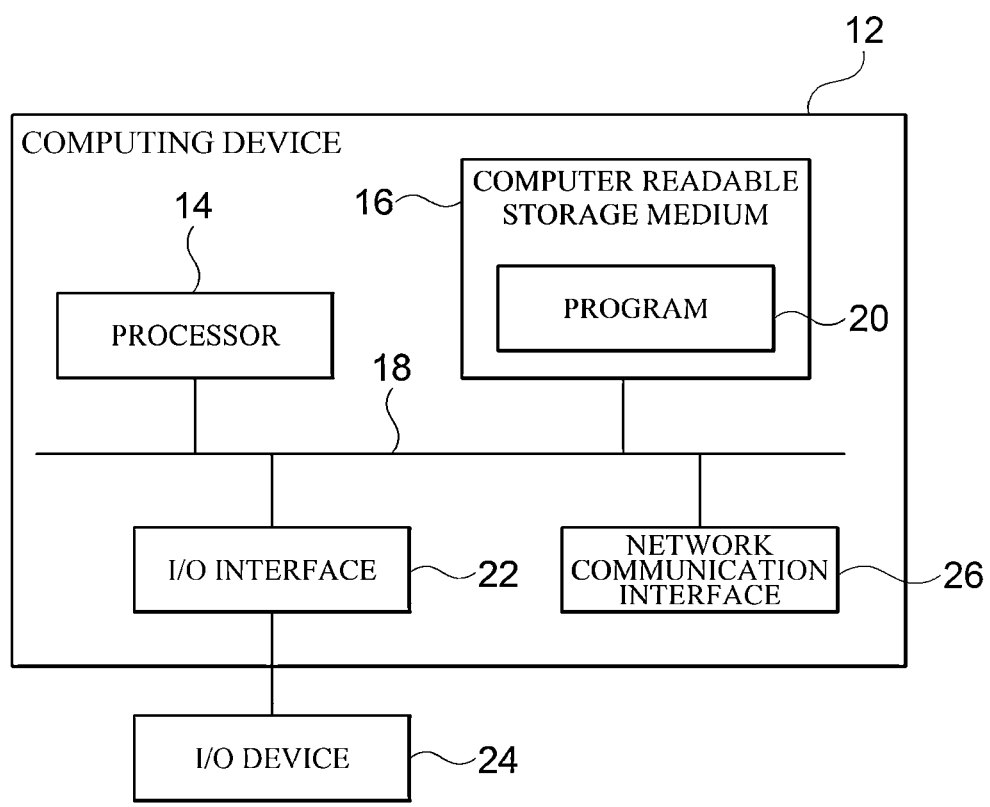
FIG. 9 is a block diagram illustrating a computing environment including a computing device suitable to be used in example embodiments.

FIG. 9 is a block diagram illustrating a computing environment 10 including a computing device suitable to be used in example embodiments. In the illustrated embodiment, each component may have a function and capability different from those to be described below, and additional components not described below may be included.

The illustrated computing environment 10 includes a computing device 12. According to an embodiment, the computing device 12 may be the device 100 for generating a speech video.

The computing device 12 includes at least one processor 14, a computer readable storage medium 16, and a communication bus 18. The processor 14 may allow the computing device 12 to operate according to the example embodiments described above. For example, the processor 14 may execute one or more programs stored in the computer readable storage medium 16. The one or more programs may include one or more computer executable instructions. The computer executable instructions may be configured to allow the computing device 12 to perform the operations according to the example embodiments when executed by the processor 14.

The computer readable storage medium 16 may be configured to store computer executable instructions, program codes, program data, and/or other suitable forms of information. A program 20 stored in the computer readable storage medium 16 may include a set of instructions executable by the processor 14. According to an embodiment, the computer readable storage medium 16 may be a memory (e.g., a volatile memory such as a random access memory (RAM), a non-volatile memory, or a combination thereof), one or more magnetic disk storage devices, optical disk storage devices, flash memory devices, other types of storage media which can be accessed by the computing device 12 and store intended information, or combinations thereof.

The communication bus 18 may include the processor 14 and the computer readable storage medium 16, and interconnect various components of the computing device 12 to each other.

The computing device 12 may include one or more input/output (I/O) interfaces 22 providing an interface for one or more I/O devices 24 and one or more network communication interfaces 26. The I/O interface 22 and the network communication interfaces 26 may be connected to the communication bus 18. The I/O devices 24 may include input devices, such as a pointing device (e.g., a mouse and a track pad), a keyboard, a touch input device (e.g., a touch pad and a touch screen), a voice or sound input device, various types of sensors, and/or a capturing device, and/or output devices, such as a display device, a printer, a speaker, and/or a network card. Each of the I/O devices 24 may be one component constituting the computing device 12, may be included in the computing device 12, or may be connected to the computing device 12 as a device separate from the computing device 12.

Although the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:

1. A device for generating a speech video having one or more processors and a memory storing one or more programs executable by the one or more processors, the one or more processors are configured to:
    using a first encoder, receive a person background image corresponding to a video part of a speech video of a person and extract an image feature vector from the person background image;
    using a second encoder, receive a speech audio signal corresponding to an audio part of the speech video and extract a voice feature vector from the speech audio signal;
    using a combiner, generate a combined vector by combining the image feature vector output from the first encoder and the voice feature vector output from the second encoder; and
    using a decoder, reconstruct the speech video of the person using the combined vector as an input,
    wherein the image feature vector is a 3-dimensional vector in a form of height×width×channel, and the voice feature vector is a 1-dimensional vector in a form of channel,
    wherein the one or more processors are further configured to, using the combiner:
    transform the voice feature vector into a tensor having the same form as the image feature vector by copying the voice feature vector by the height of the image feature vector in a height direction and by copying the voice feature vector by the width of the image feature vector in a width direction, and
    generate the combined vector by concatenating the image feature vector and the voice feature vector having the same form as the image feature vector.

2. The device of claim 1, wherein the person background image input to the first encoder comprises a face and an upper body of the person, with a portion related to speech of the person being covered with a mask.

3. A device for generating a speech video having one or more processors and a memory storing one or more programs executable by the one or more processors, the one or more processors are configured to:
    using a first encoder, receive a person background image corresponding to a video part of a speech video of a person and extract an image feature vector from the person background image;
    using a second encoder, receive a speech audio signal corresponding to an audio part of the speech video and extract a voice feature vector from the speech audio signal;
    using a combiner, generate a combined vector by combining the image feature vector output from the first encoder and the voice feature vector output from the second encoder; and
    using a decoder, reconstruct the speech video of the person using the combined vector as an input,
    wherein the image feature vector is a 3-dimensional tensor in a form of height×width×channel, and the voice feature vector is a 1-dimensional vector in a form of channel,
    the one or more processors are further configured to:
    using the second encoder, output the voice feature vector having the same size as the height×width of the image feature vector, and
    using the combiner, reshape the voice feature vector into a 2-dimensional tensor having a form matching the height×width of the image feature vector, and generate the combined vector by multiplying each channel of the image feature vector by the reshaped voice feature vector.

4. The device of claim 3, wherein the person background image input to the first encoder comprises a face and an upper body of the person, with a portion related to speech of the person being covered with a mask.

5. A device for generating a speech video having one or more processors and a memory storing one or more programs executable by the one or more processors, the one or more processors are configured to:
    using a first encoder, receive a person background image corresponding to a video part of a speech video of a person and extract an image feature vector from the person background image;
    using a second encoder, receive a speech audio signal corresponding to an audio part of the speech video and extract a voice feature vector from the speech audio signal;
    using a combiner, generate a combined vector by combining the image feature vector output from the first encoder and the voice feature vector output from the second encoder; and
    using a decoder, reconstruct the speech video of the person using the combined vector as an input,
    wherein the image feature vector is a 3-dimensional tensor in a form of height×width×channel, and the voice feature vector is a 1-dimensional vector in a form of channel,
    the one or more processors are further configured to;
    using the second encoder, output the voice feature vector having the same size as the channel of the image feature vector, and
    using the combiner, reshape the voice feature vector into a 3-dimensional tensor having a form matching the channel of the image feature vector, and generate the combined vector by multiplying each height and width of the image feature vector by the reshaped voice feature vector.

6. The device of claim 5, wherein the person background image input to the first encoder comprises a face and an upper body of the person, with a portion related to speech of the person being covered with a mask.

7. A method for generating a speech video executed by a computing device comprising one or more processors and a memory storing one or more programs executable by the one or more processors, the method comprising:
- receiving a person background image corresponding to a video part of a speech video of a person;
- extracting an image feature vector from the person background image;
- receiving a speech audio signal corresponding to an audio part of the speech video;
- extracting a voice feature vector from the speech audio signal;
- generating a combined vector by combining the image feature vector output from a first encoder and the voice feature vector output from a second encoder; and
- reconstructing the speech video of the person using the combined vector as an input, wherein the image feature vector is a 3-dimensional vector in a form of height×width×channel, and the voice feature vector is a 1-dimensional vector in a form of channel, wherein the generating of the combined vector comprises:
- transforming the voice feature vector into a tensor having the same form as the image feature vector by copying the voice feature vector by the height of the image feature vector in a height direction and by copying the voice feature vector by the width of the image feature vector in a width direction; and
- generating the combined vector by concatenating the image feature vector and the voice feature vector having the same form as the image feature vector.

* * * * *